United States Patent

Ohnuma

[15] 3,643,527
[45] Feb. 22, 1972

[54] HYDRAULIC CONTROL SYSTEM FOR AN AUTOMATIC TRANSMISSION FOR A MOTOR VEHICLE

[72] Inventor: Kiyoshi Ohnuma, Toyoda-shi, Japan
[73] Assignee: Toyota Jidosha Kogyo Kabushiki Kaisha, Toyoda-shi, Japan
[22] Filed: Dec. 17, 1969
[21] Appl. No.: 885,849

[30] Foreign Application Priority Data

Dec. 28, 1968 Japan..................................43/95922

[52] U.S. Cl...................................................74/868
[51] Int. Cl................................................B60k 21/10
[58] Field of Search..........................................74/867–869

[56] References Cited

UNITED STATES PATENTS

| | | | |
|---|---|---|---|
| 2,770,148 | 11/1956 | Wayman | 74/869 |
| 3,003,368 | 10/1961 | Winchell | 74/868 |
| 3,117,464 | 1/1964 | Ivey | 74/869 |
| 3,400,613 | 9/1968 | Johnson et al. | 74/869 |

Primary Examiner—Arthur T. McKeon
Attorney—McGlew and Toren

[57] ABSTRACT

A hydraulic control system for an automatic transmission, having a torque converter or a hydraulic coupler and a servo-operated speed change gear, for use in vehicles, includes a pressure regulator regulating a control hydraulic pressure supplied to the servo-operated speed change gear, and further includes a pressure modulator valve connected to the pressure regulator to assure smooth torque transmission for a large torque demand during low speed operation of the vehicle. A compensating pressure provided by the pressure modulator valve is applied to the pressure regulator valve to assure a control pressure, proportional to the throttle pressure opening or the torque demand, being applied to the servo-operated speed change gear. The pressure modulator valve restricts the control pressure to a value below the maximum constant pressure for a throttle valve opening exceeding a certain value, preventing excessive increase in the control pressure and assuring a constant low control pressure when the vehicle speed increases to a predetermined speed or when the transmission is set for the usual driving range.

4 Claims, 5 Drawing Figures

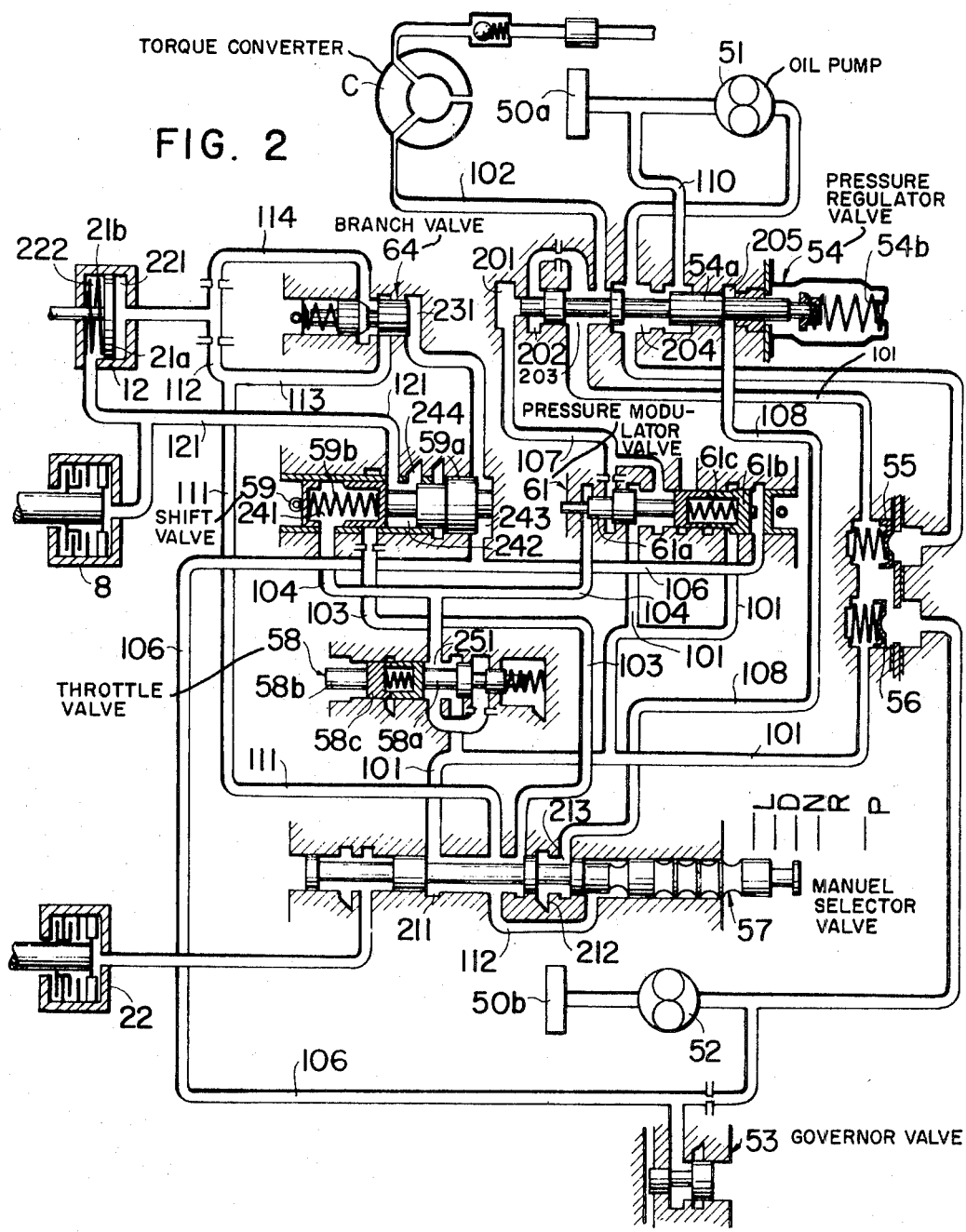

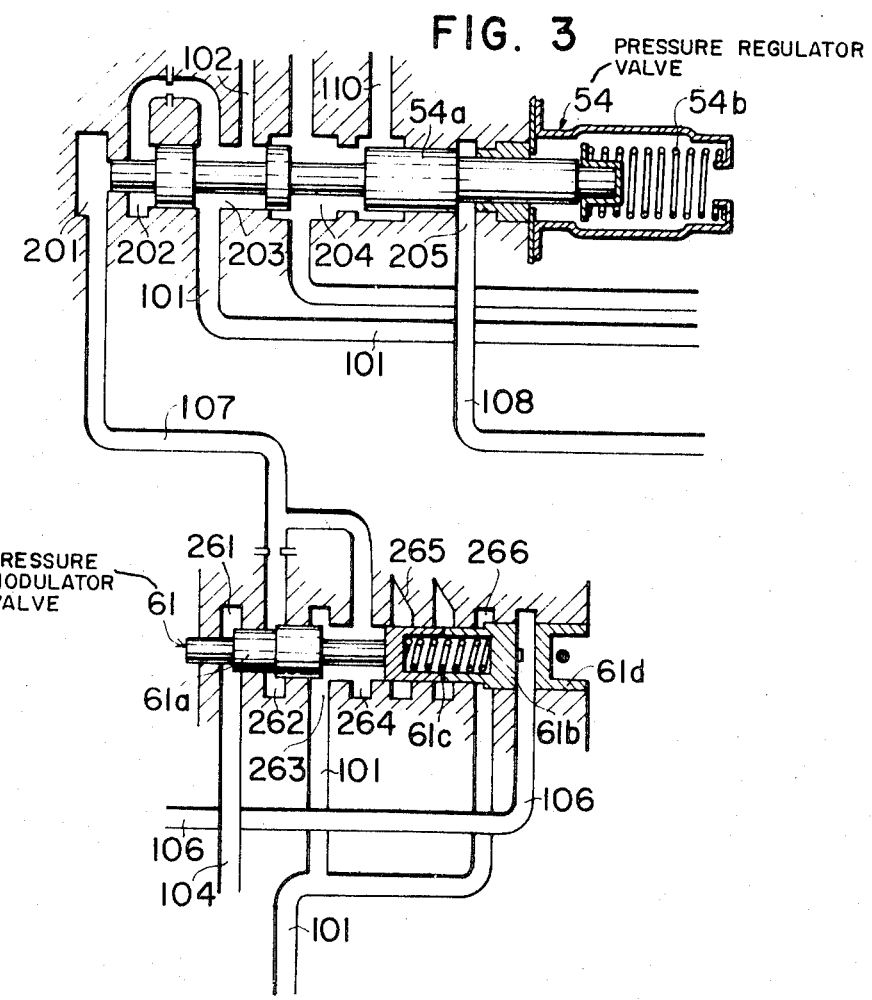

3,643,527

HYDRAULIC CONTROL SYSTEM FOR AN AUTOMATIC TRANSMISSION FOR A MOTOR VEHICLE

BACKGROUND OF THE INVENTION

Automatic transmissions, for motor vehicles, generally include hydraulic servos operating clutches and brake bands on a torque converter or on a speed change gear. A constantly pressurized hydraulic fluid, such as oil, is supplied from a front pump, coupled to the engine shaft, or a rear pump, coupled to the output shaft of the speed change gear, by means of a pressure regulator valve so that the control pressure is independent of the pump output. Thus, when a particularly large torque is required, the hydraulic pressure is insufficient for certain operation of the servos. In order to avoid this condition, up to the present the pressure regulator valve has been so adjusted as to produce a higher hydraulic control pressure than is required for ordinary running. This means that the pump or pumps must have a large capacity, and also the strength of the conduit system must be increased. This increases the cost and weight of the automatic transmission.

SUMMARY OF THE INVENTION

This invention relates to hydraulic pressure control systems for automatic transmissions for use in motor vehicles and, more particularly, to a novel hydraulic pressure control system including a pressure modulator valve in controlling relation with a pressure regulator valve and operable to assure adequately high control hydraulic pressure at low vehicle speeds while preventing excessive hydraulic control pressure at higher vehicle speeds.

An arrangement in accordance with the present invention results in smooth torque transition when the vehicle is climbing a grade or is put in motion on an upgrade. When the vehicle speed increases to a predetermined value, coordinated with a throttle opening, the control pressure is lowered to a constant low pressure such as required for ordinary running and independently of the throttle opening, so as to effect smooth automatic speed change. Furthermore, in the speed range in which the control hydraulic pressure is controlled in proportion to the torque demand, when the throttle opening exceeds a certain value, the hydraulic control pressure is suppressed or limited to a certain maximum value so as not to become excessive. This protects the conduit system as well as resulting in lowering of impact or noise during automatic gear changing. Thereby, adequate operating pressure is assured without the necessity for heavyweight equipment.

More particularly, in accordance with the present invention, the hydraulic control system includes a pressure modulator valve operable to supply a compensating pressure to the pressure regulator valve usually included in an automatic transmission of the type having a torque converter or a fluid coupler and a hydraulic servo-operated gear changer. The pressure regulator valve regulates the control hydraulic pressure supplied to the servos. The pressure modulator valve includes a movable valve body and a movable plug, which is movable independently of the valve body but which is capable of exerting an operating force on the movable valve body.

A hydraulic pressure proportional to the engine throttle opening is applied to the movable valve body, whereby a compensating pressure corresponding to the throttle opening is applied to the pressure regulator valve to control the control hydraulic pressure. A hydraulic pressure proportional to the vehicle speed, and the control hydraulic pressure, are applied to the movable plug in opposition so as to counteract each other to an extent such that the movable plug does not exert any operating force on the movable valve body as long as the vehicle speed is below a predetermined valve. When the vehicle speed equals or exceeds this predetermined value, so that the pressure proportional to the vehicle speed exceeds a predetermined value, the movable plug exerts an operating force on the movable valve body to move the same in a direction such that a compensating pressure, which is independent of the throttle opening, is applied to the pressure regulator valve to maintain the control hydraulic pressure at a constant value.

In a narrow speed range, the throttle opening is substantially proportional to the output torque, so that a pressure proportional to the throttle opening is applicable in the low-speed range. When a higher speed is desired by acceleration of the vehicle, through opening the throttle, the control pressure corresponding to the throttle opening is no longer necessary, so that the control hydraulic pressure is decreased to a certain constant value at a higher vehicle speed.

With the invention arrangement, as a control hydraulic pressure which is proportional to the throttle opening is available, this pressure, for a large opening of the throttle, will be correspondingly high, so that it will be unnecessarily high for the servos and would require an excessive strength for the conduit system. Accordingly, in further accordance with the invention, the compensating pressure is maintained constant, for example, at a zero value, to prevent the control pressure from building up to a higher pressure than a desired maximum, between a certain opening and a full opening of the throttle valve. Thus, in the invention hydraulic control system, the control hydraulic pressure has the characteristics required for the hydraulic servos in a special low-speed range, so that a sufficient torque transmission can be performed when the vehicle is climbing a grade, starting up on a grade, etc.

An object of the invention is to provide an improved hydraulic pressure control system for automatic transmissions for motor vehicles.

Another object of the invention is to provide such an improved hydraulic control system in which a control hydraulic pressure, increased in accordance with the torque demand, is provided for operating the servos during low-speed operation, with the control hydraulic pressure being reduced to a constant level when the torque demand decreases, as in higher speed operation of the vehicle.

A further object of the invention is to provide such a hydraulic pressure control system including a pressure regulating valve regulating the control hydraulic pressure, and a pressure modulating valve connected in controlling relation with the pressure regulating valve.

Another object of the invention is to provide such an improved hydraulic pressure control system in which the pressure modulating valve, at vehicle speeds up to a predetermined value, is operable in accordance with the engine throttle opening to assure a compensating pressure adjusting the pressure regulating valve to provide a control hydraulic pressure also corresponding to the throttle opening.

Another object of the invention is to provide such a hydraulic pressure control system in which, when the vehicle speed exceeds a predetermined value, the pressure modulating valve operates independently of the throttle opening to provide a compensating pressure to the pressure regulating valve maintaining the control hydraulic pressure at a substantially constant value.

A further object of the invention is to provide such a hydraulic pressure control system in which, as compared with prior art systems, the weight and the cost of the automatic transmission are substantially reduced.

For an understanding of the principles of the invention, reference is made to the following description of a typical embodiment thereof as illustrated in the accompanying drawings.

BRIEF DESCRIPTION OF THE DRAWINGS

In the drawings:

FIG. 2 is a hydraulic circuit diagram for the automatic transmission illustrated in FIG. 1;

FIG. 3 is a circuit diagram of a pressure regulator valve and an associated pressure modulator valve, embodying the present invention, to a larger scale than in FIG. 2;

DESCRIPTION OF THE PREFERRED EMBODIMENT

Figure 1:
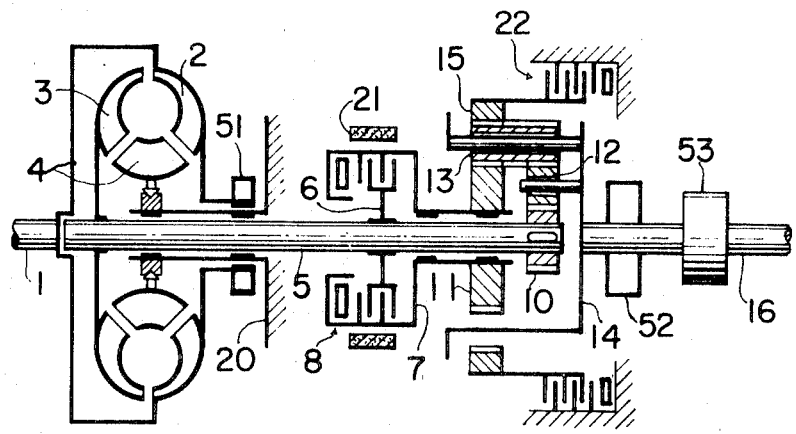
FIG. 1 is a somewhat schematic and diagrammatic illustration of one example of an automatic transmission to which the present invention is applicable.

Referring to FIG. 1, a pump impeller 2 is connected directly to an engine output shaft 1, and the power of the engine is transmitted to a turbine runner 3 by oil from pump impeller 2. The oil from turbine runner 3 is delivered to a stator 4 from which it is again supplied to pump impeller 2. By virtue of such oil flow or circulation, a torque is transmitted to a turbine shaft 5. Thus, pump impeller 2, turbine runner 3 and stator 4 constitute a torque converter. The torque from turbine shaft 5 is transmitted, at selective speeds, to an output shaft 16 through a speed change gear 20.

Speed change gear 20 comprises a speed changing unit including a multiple disc clutch 8 interposed between turbine shaft 5 and a drum 7. A brake band 21 is engageable with the external circumference of drum 7 for arresting motion of the drum. The speed change gear further includes a planetary gear unit having an input sun gear 10 secured to rotate with turbine shaft 5, a low-speed sun gear 11 connected to rotate with drum 7, planetary pinions 13 meshing with sun gear 11 and planetary pinions 12, a carrier 14 rotatably supporting planetary pinions 12 and 13, an internal ring gear 15 meshing with planetary pinions 13, and a multiple disc brake 22 provided on the external surface of internal ring gear 15. An output shaft 16 is connected to rotate with carrier 14.

To supply hydraulic fluid, such as oil, under pressure to the hydraulic servos of the torque converter, to clutch 8 and brake 22 and to brake band 21, a front oil pump 51 is mounted on a boss which rotates with pump impeller 2, and a rear pump 52 is mounted on output shaft 16. To obtain a pressure proportional to the vehicle speed, a governor 53 is also provided on output shaft 16.

As is well known, such a hydraulic automatic transmission effects gear selection between two forward speeds and one reverse speed, by selective operation of clutch 8 and brake 22 and brake band 21. More particularly, the first or low speed is obtained by releasing clutch 8 and brake 22 and applying brake band 21 to drum 7 to hold the latter stationary, as well as to hold stationary the low sun gear 11 interlocked with drum 7. Thereby, a low forward speed is provided which is lower than the rotating speed of turbine shaft 5.

A second or higher forward speed is obtained by applying clutch 8, releasing brake band 21 and releasing brake 22, so that low-speed sun gear 11 is rotated, together with input shaft 10, in the same direction to connect turbine shaft 5 directly with output shaft 16 through pinions 12 and 13. This establishes a higher forward speed.

A reverse speed in provided by releasing clutch 8 and brake band 21, and by engaging brake 22 to restrain rotation of internal ring gear 15. Thereby, output shaft 16 is caused to rotate in the reverse direction at a reduced speed.

Gear or speed selection is effected by movement of a manual control valve 57 in the hydraulic control circuit shown in FIG. 2, such movement being effected by a gear or speed selecting lever. Valve 57 is moved between "low" (L), "drive" (D), "neutral" (N), "reverse" (R) and "parking" (P). When the selection lever is placed in position D, selection of the first and second forward speeds, as mentioned above, is automatically effected in dependence on the vehicle speed and the engine throttle opening, through the medium of a shift valve 59 connected to the engine throttle.

In the hydraulic circuit or control diagram of FIG. 2, the hydraulic servos of clutch 8 and brake 22 and of brake band 21 are illustrated at the left, and the hydraulic fluid or oil under pressure is supplied to these servos either directly, through manually operated valve 57, or automatically, through shift valve 59, to effect the speed or gear changes as mentioned above. In the position illustrated in the drawing, the manual valve 57 is at the drive position D and gear changeover for the first and second forward speeds is automatically effected by alternately applying clutch 8 and brake band 21.

The hydraulic fluid or oil for operating these servos is drawn from oil sumps 50a, 50b, by means of front oil pump 51 and rear oil pump 52. The higher of the oil pressures from these two pumps is selected by respective check valves 55 and 56, for supply to control pressure line 101. As illustrated in FIG. 2, oil or hydraulic fluid under pressure is supplied by pump 52 to line 101 through check valve 56. The pressure in line 101 is called a "control pressure" or a "line pressure."

One end of line 101 is connected to a chamber 203 of a pressure regulator valve 54, and the pressure in chamber 202 acts as a force to urge valve body 54a to the right against the bias of a spring 54b. Hydraulic fluid from line 101, in chamber 203, is discharged through chamber 204 to sump 50a. The quantity of oil thus discharged increases in accordance with an increase in the pressure in line 101, and lowers the discharge pressure of pump 52. As a result, the control pressure in line 101 is maintained at a constant value corresponding to the bias or force of spring 54b and irrespective of the operating speed of pump 52.

The regulated control pressure is supplied directly, from chamber 203 of regulator valve 54 through line 101, to torque converter C, and simultaneously, through a chamber 211 of manually controlled valve 57, to lines 103 and 111. The regulator control pressure is also applied directly to a chamber 221 of the servo for brake band 21, through lines 111 and 112. This urges a piston 21a of the servo to the left, against the bias of a spring 21b, to apply brake band 21. Thereby the first or low speed is established.

In addition, and as explained in more detail hereinafter, in the low-speed range and as the pressure proportional to the vehicle speed or the governor pressure decreases substantially, a flow circuit in parallel with line 112 is formed by line 113, branch valve 64, and line 114. The governor pressure is applied to a chamber 231 of branch valve 64.

The control pressure in line 103 is applied to shift valve 59 and then to a line 121 through a chamber 242, if the governor pressure increases above a predetermined value for the pressure then proportional to the throttle valve opening, or the throttle pressure. Thus, the pressure of line 103 is applied to clutch 8 and to a chamber 222 of the servo for brake band 21, to engage clutch 8 and to release brake band 21 simultaneously. Thereby, the second speed or the higher speed is established.

On the contrary, if the governor pressure decreases below a predetermined value for the particular throttle responsive pressure, shift valve 59 operates to shut off the control pressure from line 103, and, at the same time, pressure oil forced into clutch 8 and into the brake band servo chamber 222 is discharged into chamber 242 through line 121 and flows to exhaust port 244. Thus, the transmission is restored again to the first or lower speed.

The governor pressure acts on a chamber 243 at the right end of shift valve 59, and the throttle pressure acts on a chamber 241 containing a spring 59b. The governor pressure, obtained by action of governor 53, is available in line 106 which branches from the discharge line or rear oil pump 52.

The throttle pressure operates to transmit the movement of the engine throttle valve or accelerator (not shown) to plug 58b in throttle valve 58, and urges valve body 58a to the right through the medium of spring 58c. Thus the control pressure of line 101 is applied to chamber 251, from which it is applied to line 104 as a pressure proportional to the opening of the engine throttle valve.

A line 108 connects a chamber 205 of pressure regulator valve 54 to a chamber 213 of the manually operated valve 57. The purpose of this line is to supply the control pressure in chamber 211 of manual valve 57 through line 112 to chamber 213, and also to the chamber 205 of pressure regulator valve 54, when manual valve 57 is moved to the L-position. Through line 108, when valve 57 is in the L-position, the control pressure in 205 urges valve body 54a to the left in conjunction with spring 54b of pressure regulator valve 54, so that the control pressure in chamber 203 is constantly controlled at a higher pressure. Namely, in the low-range L, the brake band servo only is operated as in the first or low speed of the D range, and naturally a large torque is required in the transmission, so that a particularly high control pressure must be supplied not only to the servo for brake band 21 but also to torque converter C.

As explained above, there is a difference in the magnitude of the control pressure, between the drive range D and the low-range L. However, each of these pressures is always controlled to be constant independently of the transmission torque in the transmission gear. In such a hydraulic pressure control system, when a particularly large torque is required, the control pressure to actuate clutch 3 and brake 22 and brake band 21 becomes insufficient. In order to prevent this, the control pressure must previously be set to a higher value in a corresponding degree beforehand.

For this purpose, in accordance with the present invention, there is provided a pressure modulator valve 61 which applies a compensating pressure through a line 107 to a chamber 201 at the left hand of the valve body 54a in pressure regulator valve 54, the control pressure in chamber 203 being controlled or regulated by this compensating pressure. The compensating pressure is intended to have such characteristics that the control pressure is proportional to the torque transmitted through the transmission at the time of control. FIG. 3 illustrates the hydraulic circuit diagram for pressure regulator valve 54 with pressure modulator valve 61, in more detail than illustrated in FIG. 2.

Referring to FIG. 3, pressure modulator valve 61 includes a movable valve body 61a, a movable valve plug 61b, which is movable independently of valve body 61a, and a compression spring 61c interposed between valve body 61a and plug 61b. Valve 61 also includes chambers 261, 262, 264, 266 and 267, valve port 263 and oil discharge port 265 between the ends of a cylindrical valve chamber. A stop plug 61d closes the right end of the valve chamber. Chamber 261 is connected to line 104 by means of which it is supplied with a pressure proportional to the opening of the throttle valve, or the throttle pressure from the throttle valve. Valve port 263 is connected to control pressure line 101.

By movement of valve body 61a, with resulting change in the flow cross-sectional area of chamber 264, the control pressure in line 101 is converted into a compensating pressure having characteristics, as explained hereinafter, to be supplied from chamber 264 to line 107. The compensating pressure, also effective in chamber 262 through orifices and the like, will act as an operating pressure to urge valve body 61a toward the right in conjunction with the throttle pressure in line 104. Discharge port 265 communicates with chamber 264 upon movement to the right of valve body 61a and, upon blocking of valve port 263, the pressure in chamber 264 is reduced to zero. The control pressure in line 101 is applied to chamber 266 of valve 61 to urge plug 61b to the right. However, in chamber 267 there is a pressure proportional to the governor pressure, supplied from line 106, which urges movable plug 61b to the left. Thus, the operating force exerted by the control pressure in chamber 266, and the operating force exerted by the control governor pressure in chamber 267, are in opposition, so that a difference between these pressures is necessary to operate movable plug 61b. When the operating force is operable to move plug 61b to the right, or weaker than the rightward operating force acting on valve body 61a, even in the left direction, the movable plug 61b is moved to the right to engage stop plug 61, where plug 61b is restrained by an abutment or projection on its end face so as to maintain a space between itself and plug 61d.

Under these conditions, movable plug 61b is restrained from further movement to the right, and the operating forces applied to plug 61b by the pressure in chambers 266 and 276 have no significance for valve body 61a, so that movable plug 61b serves only as a restraining member for one end of spring 61c. In this case, the compensating pressure will be controlled solely in dependence upon the throttle pressure.

With an increase of the throttle pressure acting in chamber 261, valve body 61a is moved to the right to narrow valve port 263 to lower the pressure in chamber 264 and simultaneously to lower the pressure in chamber 262. This pressure control is effected utilizing extremely small flow sectional areas of valve port 263 and chamber 264 so that, although there is a comparatively large increase in the throttle pressure, movement of valve body 61a remains small and the change in the compression of spring 61c, due to the movement to the right of valve body 61a, is also small. Thus, even though the throttle pressure increases, the force of spring 61c is maintained nearly constant. Also, the force acting on valve body 61a and opposing this nearly constant force of spring 61c must be constant, so that a resultant of the operating force due to the throttle pressure in chamber 261 and the operating force due to the compensating pressure in chamber 262 also should be nearly constant.

Figure 4:
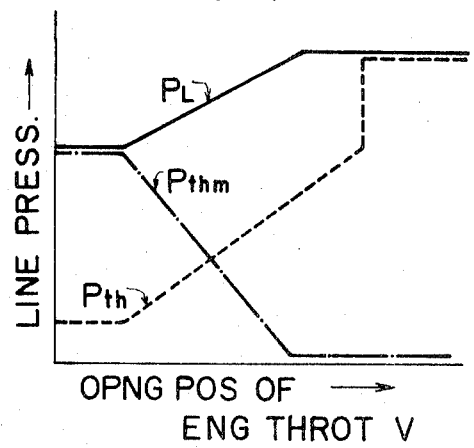
FIG. 4 is a graphical illustration of the characteristic curves of various hydraulic pressures for the throttle openings, in accordance with the pressure modulator valve of the invention.

To meet this requirement, the compensating pressure should have a characteristic which decreases rectilinearly in accordance with an increase of the throttle pressure, and such a relation is shown in FIG. 4. In FIG. 4, the curve Pth represents the change of throttle pressure obtainable in throttle valve 58 responsive to opening of the engine throttle. This throttle pressure does not increase proportionally to the opening of the throttle, but remains constant in a small opening range and also in a range near to the full opening of the throttle. This is the reason for the design of the throttle valve 58.

On the other hand, the compensating pressure shown by the curve Pthm is also maintained constant and has a high value with a small throttle opening range and at the constant throttle pressure Pth, while it is decreased rectilinearly to eventually reach zero in accordance with an increase of the throttle pressure Pth. When the value reaches zero, the operating force due to the throttle pressure as applied to valve body 61a overcomes the force of spring 61c, which exhibits a constant reaction maintaining a constant compression value. By virtue of this relation, the resultant, that the operating force due to the throttle pressure in chamber 261 and the operating force due to the compensating pressure in chamber 262, is constant, will no longer be true, and valve body 61a fully blocks valve port 263 to connect chamber 264 to discharge port 265, thus maintaining the compensating pressure at zero. The throttle opening at which the compensating pressure reaches zero can be regulated by changing the characteristic of spring 61c.

The compensating pressure as shown by curve Pthm in FIG. 4, is applied to chamber 201 of pressure regulator valve 54 through line 107, to act as an operating force to urge valve body 54a to the right in cooperation with the control pressure in chamber 202. The regulation of the control pressure in line 101, as previously explained with reference to FIG. 2, is effected in a manner such as to discharge the control pressure oil to oil sump 50a through chamber 204 by movement to the right of valve body 54a. The resultant of the operating force due to the compensating pressure and the operating force due to the control pressure, on valve body 54a, should be a nearly constant value corresponding to the force of spring 54b similarly to the conditions in pressure modulator valve 61.

As a consequence, the control pressure decreases rectilinearly with an increase of the compensating pressure. In other words, it increases rectilinearly with a decrease in the compensating pressure. The curve PL of FIG. 4 illustrates the control pressure as regulated in this manner. As clear from this curve, the control pressure is regulated to a constant value with a relatively small throttle opening range. When the opening of the throttle valve exceeds this small range, so as to lower the compensating pressure Pthm to zero, the control pressure increases to a constant maximum value which it does not exceed. At less than this throttle valve opening, control pressure $P_L$ varies in accordance with the throttle valve opening, so that there is obtainable a control pressure in the transmission corresponding substantially to the torque demand. Therefore, inadequate control pressure for operation of the servos can be prevented perfectly as, for example, when the vehicle is proceeding upgrade or is starting on an upgrade.

In pressure modulator valve 61 if, with an increase of the governor pressure acting in chamber 267, the operating force tending to move plug 61b to the left exceeds the operating force tending to move valve body 61a to the right, movable plug 61b, which so far has been moved to the right and restrained, produces a net force to move valve body 61a to the left through the medium of spring 61c. This force, as will be understood from the foregoing explanation, acts to increase the compensating pressure and, moreover, decrease the control pressure in pressure regulator valve 54. This decrease of the control pressure results in a decrease of the counter operating force in chamber 266 of pressure modulator valve 61, so that the force exerted by movable plug 61b to move valve body 61a to the left is greatly increased to move valve body 61a suddenly to the left to increase the opening of valve port 263, thus resulting in equalizing the control pressure and the compensating pressure. Namely, under such conditions, not only the throttle pressure but also the governor pressure become no longer related to the magnitude of the compensating pressure. If a compensating pressure equal to this control pressure is applied to the chamber 201 of pressure regulator valve 54, only the control pressure, together with the control pressure of chamber 202, acts as an operating force to urge valve body 54a to the right, and is kept at a constant and low value corresponding to the spring 54b.

Figure 5:
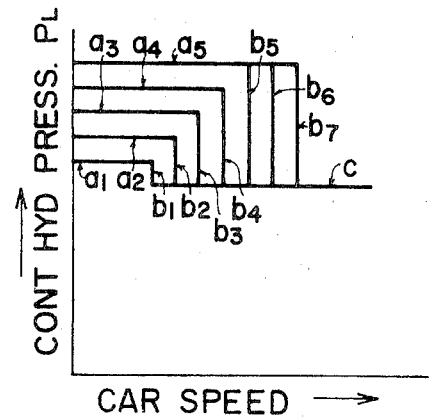
FIG. 5 is a graphical illustration of characteristic curves of control pressures for vehicle speeds in accordance with the hydraulic control system of the present invention.

This condition is illustrated in FIG. 5. The horizontal lines $a_1$ through $a_5$ illustrate that each of the control pressures is maintained constant corresponding to the opening of the engine throttle, on the curve $P_L$, and independently of the vehicle speed or the governor pressure. That is, the group of horizontal lines $a_1$ through $a_5$ illustrate control pressures corresponding to engine throttle openings established at a vehicle speed range in the low-speed area.

Line $a_1$ represents a characteristic when the throttle is wholly closed. Each of the lines $a_2$ through $a_4$ represents a characteristic corresponding to gradual increase of the throttle opening. Line $a_5$ represents a characteristic when the control pressure is limited to the maximum value, between a certain throttle opening and a full throttle opening.

Thus, when the vehicle speed gradually rises in accordance with respective throttle valve openings and, if the speed reaches a certain value corresponding to the respective throttle valve opening, each of the control pressures decreases suddenly as illustrated by the vertical lines $b_1$ through $b_7$, and then is maintained at a constant and low value as shown by the horizontal line C. The governor pressure, as explained above, attains a value, at a speed higher than that corresponding to the vertical line $b_7$, which is a borderline for changing over to full opening of the throttle, such that, under such conditions, a compensating pressure equivalent to the control pressure is continuously applied to pressure regulator valve 54 from pressure modulator valve 61, and thereafter a constant control pressure, such as normally required is supplied to the hydraulic servos.

In accordance with the present invention, at the low-speed range L requiring, comparatively, a large accelerating torque, a control pressure corresponding to the throttle opening is obtainable, so that a control pressure sufficiently high can be supplied to the hydraulic servos for operation of the clutches and brake bands of the transmission. This prevents inadequacy of the servo capacity at the time of ascending an upgrade or starting the vehicle on an upgrade. As a control pressure is maintained at the low pressure usually required when the vehicle speed exceeds a certain value, in the case of the automatic gear change being at the D position, gear shifting can be effected smoothly without disagreeable impact and noise. Moreover, in the range where the control pressure is controlled according to the throttle opening, the control pressure is limited to a maximum value between a certain opening of the throttle, less than full opening, and full opening of the throttle, so that the conduit system can be adequately protected against excessive pressure.

Additionally, while the foregoing explanation has been directed to the condition where manual valve 57 is in the D position, even if the vehicle is driven at low speed with the manual valve 57 in the L position, the control pressure is controlled by pressure modulator valve 61, to assure proper operation of the servos.

The case is similar with respect to "reverse" movement of the vehicle, with valve 57 in the R position. Additionally, it should be understood that the invention is applicable not only to automatic transmission of the type having two forward speeds and one reverse speed, as explained as a preferred embodiment, but also to transmissions having a different number of forward and reverse speeds.

While a specific embodiment of the invention has been shown and described in detail to illustrate the application of the principles of the invention, it will be understood that the invention may be embodied without departing from such principles.

What is claimed is:

1. In an automatic transmission for a motor vehicle having an engine drive shaft, a manually operable throttle and a manually operable speed selector, the transmission including a hydraulic servo-operated speed change gear, fluid torque transmitting means coupling the engine drive shaft to the speed change gear, a hydraulic pressure regulating valve regulating a control hydraulic pressure supplied to the servo-operated speed change gear, and a speed responsive governor: a hydraulic pressure control system comprising, in combination, a pressure modulator valve including a movable valve body and a movable plug movable independently of said valve body, said plug being operable to apply an operating force to said movable valve body; means connecting said pressure modulator valve to said pressure regulating valve to apply a compensating hydraulic pressure to said pressure regulating valve in accordance with displacement of said valve body; a throttle valve operable by said throttle and connected to said pressure modulator valve to apply, to said movable valve body, a hydraulic pressure proportional to opening of said throttle to vary said compensating pressure in accordance with the opening of said throttle to correspondingly vary said control hydraulic pressure; and means, including said governor, applying directly to one side of said movable plug only a hydraulic pressure proportional directly to the vehicle speed and, to the other side thereof, said only control hydraulic pressure; whereby said movable plug exerts no operating force on said valve body until the hydraulic pressure proportional to the vehicle speed exceeds a predetermined value; said movable plug, when the hydraulic pressure proportional to the vehicle speed exceeds said predetermined value, exerting an operating force on said valve body in opposition to said hydraulic pressure proportional to said throttle opening, to move said valve body in a direction to apply, to said pressure regulating valve, a compensating pressure independent of the throttle opening to maintain said control hydraulic pressure constant.

2. In an automatic transmission for a motor vehicle, a hydraulic pressure control system, as claimed in claim 1, in which, when the throttle opening exceeds the predetermined value while the hydraulic pressure proportional to the vehicle speed is below a predetermined value, said modulator valve applies, to said pressure regulating valve, a compensating pressure independent of the throttle opening and effective to maintain said control hydraulic pressure at a constant maximum value.

3. In an automatic transmission for a motor vehicle, a hydraulic pressure control system, as claimed in claim 1, in which said pressure modulator valve includes a bore in which said movable valve body and said movable plug are movable; a spring interposed between said movable plug and one end of said movable valve body; and means applying, to the opposite end of said movable valve body, a hydraulic pressure proportional to opening of said throttle.

4. In an automatic transmission for a motor vehicle, a hydraulic pressure control system, as claimed in claim 3, in which said bore includes a chamber connected to said pressure regulating valve and having said control hydraulic pressure supplied thereto through a port; said movable valve body, responsive to a hydraulic pressure proportional to opening of said throttle and above a predetermined value, blocking said port and connecting said chamber to a discharge port to reduce said compensating pressure to zero.

* * * * *